United States Patent [19]

Seiler et al.

[11] Patent Number: 5,277,727
[45] Date of Patent: Jan. 11, 1994

[54] CONTOURED REPLACEMENT TREAD

[75] Inventors: Ronald R. Seiler; Herbert J. Roelle, both of Muscatine, Iowa

[73] Assignee: Bandag Licensing Corporation, Muscatine, Iowa

[21] Appl. No.: 902,776

[22] Filed: Jun. 23, 1992

Related U.S. Application Data

[63] Continuation of Ser. No. 634,421, Dec. 27, 1990, abandoned.

[51] Int. Cl.⁵ .............................................. B29D 30/54
[52] U.S. Cl. ................... 156/95; 152/209 R; 156/128.1; 156/130.3
[58] Field of Search .................. 152/209; 156/95, 96, 156/98, 128.1, 128.6, 130.3, 130.5, 130.7, 406.4, 909

[56] References Cited

U.S. PATENT DOCUMENTS

| | | |
|---|---|---|
| 2,976,910 | 3/1961 | Nowak . |
| 3,136,673 | 6/1964 | Carver . |
| 3,157,218 | 11/1964 | Brown ............................ 152/209 R |
| 3,236,709 | 2/1966 | Carver . |
| 3,283,795 | 11/1966 | Schelkmann . |
| 3,325,326 | 6/1967 | Schelkmann . |
| 3,689,337 | 9/1972 | Schelkmann ...................... 156/96 |
| 3,752,726 | 8/1973 | Barefoot . |
| 3,815,651 | 6/1974 | Neal . |
| 3,837,385 | 9/1974 | Schelkmann . |
| 3,895,985 | 7/1975 | Schelkmann ...................... 156/96 |
| 3,919,020 | 11/1975 | Floto ................................ 156/96 |
| 3,951,720 | 4/1976 | Brodie . |
| 4,046,947 | 9/1977 | Brodie . |
| 4,075,047 | 2/1978 | Brodie et al. . |
| 4,151,027 | 4/1979 | Schelkmann et al. . |
| 4,434,018 | 2/1984 | Brewer . |
| 4,500,375 | 2/1985 | Goldstein . |
| 4,626,300 | 12/1986 | Barefoot .......................... 156/96 |
| 4,815,511 | 3/1989 | Brayer et al. ................... 152/454 |
| 5,011,397 | 4/1991 | Remond . |

FOREIGN PATENT DOCUMENTS

| | | |
|---|---|---|
| 0176945 | 9/1986 | European Pat. Off. . |
| 0121835 | 10/1989 | European Pat. Off. . |
| 0403440 | 12/1990 | European Pat. Off. . |
| 1934767 | 1/1971 | Fed. Rep. of Germany . |
| 2642990 | 4/1977 | Fed. Rep. of Germany . |

Primary Examiner—Michael W. Ball
Assistant Examiner—Nancy T. Krawczyk
Attorney, Agent, or Firm—Foley & Lardner

[57] ABSTRACT

A pre-vulcanized tread for installation on a tire casing includes a sole and an upper tread portion which are each arched between respective skirts. The arc of the sole differs from the arc of the upper tread portion by a predetermined constant. In the preferred embodiment, the skirts include generally planar interior and exterior wall portions, the skirts joining the sole along a radius which is less than the radius of the sole itself. The exterior sidewall is disposed at a predetermined angle with respect to the vertical such that the width of a nominal arc of the sole radius intersecting the exterior walls is of a predetermined length which is greater than the width of the upper tread portion arc, and the interior walls of the respective skirts are disposed at a different angle with respect to vertical such that an extension of the interior wall intersecting the nominal arc of the sole defines another arc width which is less than the width of the upper tread portion arc.

25 Claims, 3 Drawing Sheets

CONTOURED REPLACEMENT TREAD

This is a continuation of application Ser. No. 07/634,421 filed Dec. 27, 1990, abandoned.

TECHNICAL FIELD

The present invention relates to a replacement tread for pneumatic tires, and a method using such tread in a retreading operation. More particularly, this invention relates to a prevulcanized replacement tread strip contoured to provide improved consistency in application, appearance and road endurance.

BACKGROUND OF THE INVENTION

In general, retreading pneumatic tires by applying a precured (e.g. prevulcanized) tread strip to a tire casing is known. Examples of such retreading process, sometimes referred to as cold vulcanizing or cold bond retreading, are disclosed in U.S. Pat. Nos. 2,976,910 issued to Nowak on Mar. 28, 1961; 3,136,673 issued to Carver on Jun. 9, 1964; 3,236,709 issued to Carver on Feb. 22, 1966; 3,283,795 issued to Schelkmann on Nov. 8, 1966; 3,325,326 issued to Schelkmann on Jun. 13, 1967; 3,745,084 issued to Schelkmann on Jul. 10, 1973; 3,752,726 issued to Barefoot on Aug. 14, 1973; 3,951,720 issued to Brodie on Apr. 20, 1976; 4,046,947 issued to Brodie on Sep. 6, 1977; and 4,075,047 issued to Brodie et al. on Feb. 21, 1978; 4,151,027 issued to Schelkmann et al. on Apr. 24, 1979; and, 4,434,018 issued to Brewer on Feb. 28, 1984.

In such retreading procedures, the tire casing to be retreaded is typically buffed to remove excess rubber, to provide a generally evenly textured crown for receiving the cured tread strip and to provide a predetermined shoulder profile. Tire casings typically include a belt package, (a package of steel belts or cables), underlying the road engaging surface, (e.g., the original tread) of the tire. The casing typically is buffed at a predetermined characteristic crown radius generally corresponding to the upper contour of the belt package, but leaving only a predetermined thickness, e.g., 3/32 of an inch, of material remaining over the top belt. The shoulder of the casing is also buffed (trimmed) to eliminate or reduce voids or patterns in the shoulder created by the original tread, and to provide a relatively straight profile between the casing sidewalls and crown. The casing from each of the various types of known new tires has a characteristic crown width, crown buffing radius and shoulder trim angle.

The precured tread strip, typically of a width corresponding to the width of the crown of the casing and cut to a length corresponding to the casing crown circumference, is likewise disposed circumferentially about the casing crown, overlying a layer of suitable bonding material, such as uncured cushion gum including a low temperature vulcanizing agent and accelerator. A roller pressing process, commonly referred to as stitching, is performed on the assembly to force out air from between the tread strip and casing. The assembly is then subjected to heat and pressure to cure (e.g., vulcanize) the bonding layer, generally in an autoclave. This bonds the prevulcanized tread strip to the casing, and typically, forces out any residual trapped air from between the tread and casing.

Perhaps the most common prevulcanized tread strip, known as a "top cap", is a strip of prevulcanized material, manifesting a predetermined tread design on the top surface thereof, and having an underside which is generally flat. Other top caps described in the prior art employ an underside having approximately the same curvature as the crown of the casing of the particular tire casing to be retreaded. The width of the top cap characteristically corresponds to the crown width of the casing. The characteristic shoulder trim angle for a casing is conventionally chosen to provide a substantially continuous interface at the juncture of the top cap and casing, i.e., to eliminate or reduce any ledge at the juncture, as well as to eliminate or reduce voids or remnants of the original tread design in the shoulder.

A number of problems arise from conventional trimming of the casing shoulder. If too much material is removed, for example, to eliminate or reduce voids or remnants of the original tread pattern in the shoulder, a narrow crown may result. Moreover, the integrity of the casing can be deleteriously affected by leaving insufficient material in the shoulder in the vicinity of end of the casing belt package. In such an instance, the casing tends to crack or otherwise break down in the shoulder area. A shoulder extrusion formed of uncured rubber stock can sometimes be disposed on the shoulder to, in effect, replace the shoulder area. However, such uncured rubber stock used in retreading tends to be relatively expensive for labor and material.

In addition, the buffed shoulder is often unsightly, even when structurally sound. This gives rise to a particular problem when the tire is used on, for example, a rental truck intended to be used by consumers who may not be familiar with retreads.

Precured tread strips having a contoured underside have been proposed. For example, a variant of the top cap including a substantially flat underside, but with tapering side lobes extending at an angle from the tread strip intended to overlie the shoulder of the casing is disclosed in Offenlegungsschrift 26 42 990 published on Apr. 7, 1977 in the name of Maltinti. The juncture between the flat underside and interior surface of the lobe is abrupt; the edges purportedly aid in centering the tread on the casing. Contrary to the teachings of Maltinti, the abrupt transition at the underside of the lobe causes the assembly to be susceptible to small offsets in alignment, and imprecisions in buffing the tire to the precise dimensions corresponding to the contour of the tread underside, causing air to be trapped between tread strip and casing, and potentially heat generating stresses in the tire.

Mechanisms that purport to provide a contoured tread that can be installed on a casing without creating stresses in the retread assembly have been suggested. For example, European Patent Application Publication No. 0 176 945 published in the name of Michelin Et Cie on Sep. 4, 1986 (bulletin 86/15) discloses a prevulcanized tread strip Which is curved both in the transverse and longitudinal (circumferential) directions. The radius of curvature of the tread underside in the transverse direction varies to better fit the shape of the top of the casing to be retreaded; the radius is maximum at the center and minimum at the shoulders. The curvature in the longitudinal (circumferential) direction purportedly avoids unacceptable stresses in the retread assembly.

U.S. Pat. No. 3,283,795 issued to Schelkmann on Nov. 8, 1966 discloses a prevulcanized tread strip having an underside manifesting a transverse curve with a radius of curvature greater than the radius of curvature of the casing crown. Such a contour is said to ensure that the central portion of the tread will first engage the casing crown, so that any air trapped between the tread strip and casing will be gradually squeezed out between the surfaces. Unacceptable stresses are purported to be avoided by employing a plurality of tread sections to form the retread assembly, each curved not only in the transverse direction, but also in the longitudinal direction (direction of elongation of the tread), or by including compensation folds or cuts in the tread.

It has also been proposed to avoid creating stresses in the retread assembly by employing, rather than a strip of tread, a premolded endless ring of tread having a relaxed diameter less than the inflated diameter of the tire casing. The replacement tread ring is stretched, disposed about the prepared tire casing, together with an intermediate layer of bonding material, then "snapped" onto the casing. The tread ring typically includes integral shoulder wings extending downwardly over the shoulders of the tire casing. An example of such a retreading system is described in U.S. Pat. No. 3,815,651 issued to Neal on Jun. 11, 1974.

However, prior art contoured treads are designed for a particular casing, and are relatively intolerant of varying crown arc width and radius; deviations from the specific crown width and crown radius create stresses in the retread assembly deleterious to operation and longevity. Thus, a large number of different tread strips are required to be on hand in order to recap the various commercially available tires.

There remains a need for a cold vulcanizing retreading process that substantially replicates the original tread width of the casing as a new tire, while at the same time accommodating a range of tire casings, e.g., a tire series, without creating deleterious stresses in the retread assembly. Moreover, there remains a need for a replacement tread, when used in such a process, which when applied to a tire casing forms a retread assembly having improved appearance and endurance, performance and wearability characteristics.

SUMMARY OF THE INVENTION

A prevulcanized tread for installation on a tire casing is provided. The tread includes a sole, an upper tread portion manifesting a predetermined tread design disposed between respective shoulders, and respective skirts. The sole includes, in a cross-sectional plane, a portion of nominal arc of a predetermined radius of curvature $R_{TI}$. The upper tread portion has associated therewith a nominal arc extending between the tread shoulders which has a predetermined radius of curvature equal to $R_{TI}$ plus a predetermined constant, and a predetermined arc length $AW_T$. The tread skirts each include a generally planar interior wall, an interior interconnecting portion which couples the interior wall to the sole, an exterior side wall extending downwardly and outwardly from the tread's shoulders and an end portion connecting the interior and exterior walls. The interior interconnecting portion includes, in the cross-sectional plane, a portion of a nominal arc having a predetermined radius of curvature $R_{TS}$, which is less than $R_{TI}$. The exterior sidewall is disposed at a predetermined angle $\alpha$ with respect to the vertical and such that the portion of the nominal arc of radius $R_{TI}$ extending between respective intersections with the exterior sidewalls is of a predetermined length $AW_{OD}$ which is greater than $AW_T$. The interior walls of the respective skirts are disposed at a predetermined angle $\Theta$ with respect to vertical, and such that the portion of the nominal arc of radius $R_{TI}$ extending between respective intersections with nominal extensions of the interior walls is of a predetermined length $AW_{ID}$ which is less than $AW_T$.

A retread tire is also provided comprising a tire casing and the prevulcanized tread of the invention installed thereon. The tire casing includes a peripheral crown manifesting, in a cross-sectional plane through the nominal axis of rotation of the casing, an arc having a predetermined radius of curvature, $R_c$, and a predetermined arc length, $AW_c$. The casing also includes respective shoulders disposed on either side of the crown, each manifesting, in the cross-sectional plane through the nominal axis of rotation of the casing, an arc having a radius of curvature, $R_{CS}$, which is less than $R_C$.

BRIEF DESCRIPTION OF THE DRAWING

The preferred exemplary embodiment of the invention will be hereinafter described in conjunction with the appended drawing, wherein like designations denote like elements, and.

DETAILED DESCRIPTION OF THE PREFERRED EXEMPLARY EMBODIMENT

Figure 1:
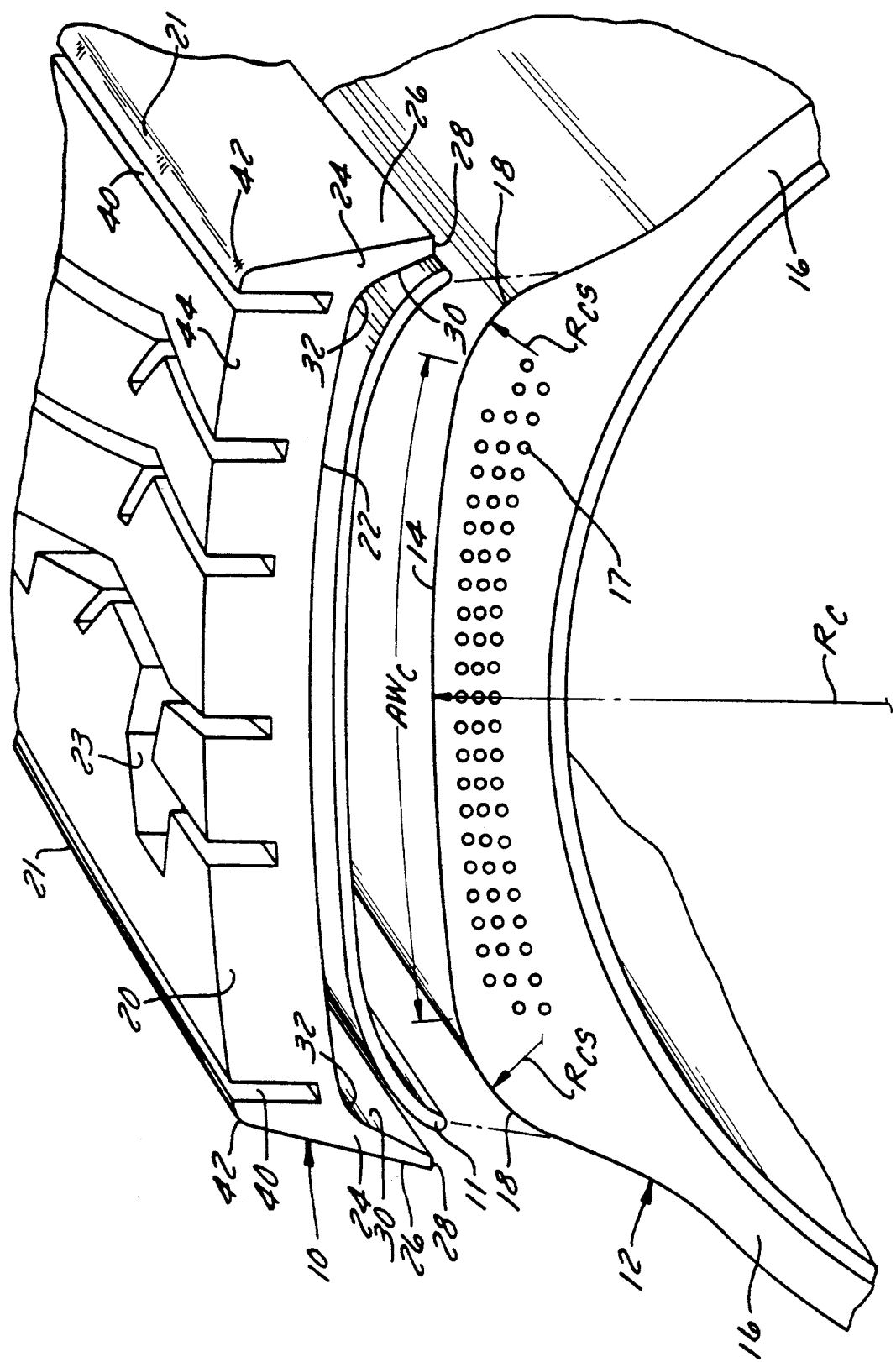
FIG. 1 is an exploded, schematic, pictorial vertical cross section of a casing prepared in accordance to the invention, a layer of binding material and a precured tread strip in accordance with the present invention.

Referring to FIG. 1, a precured (e.g., prevulcanized) replacement tread strip 10, and a strip of uncured bonding material 11, such as uncured cushion gum including a low temperature vulcanizing agent and accelerator, are adapted to be affixed to a tire casing 12 through a cold vulcanizing process. Tire casing 12 includes a crown portion 14 bounded on either side by respective shoulder portions 18 and sidewalls 16, and including a conventional belt package 17 underlying crown 14. As will be explained, the crown 14 and shoulders 18 of casing 12 manifest a predetermined configuration suitably formed by buffing.

The surface of crown 14 of casing 12 is mechanically buffed to provide a textured convex arcuate configuration in a direction transverse to the circumference of casing 12. Specifically, the arc has a characteristic radius of curvature, $R_C$, (Crown Radius) generally corresponding to the upper contour of belt package 17, extending above the top belt by a predetermined thickness, e.g., 3/32 of an inch, as in the case of prior art techniques. The length of the arc at Crown Radius $R_C$ extending between shoulders defining crown 14, denominated Crown Arc Width $AW_C$ is set at a predetermined value. Crown Radius $R_C$, and Crown Arc Width $AW_c$ are characteristic to casings deriving from particular types of tires; the casing from each type of new tire has a characteristic crown radius and crown width.

In accordance with one aspect of the present invention, notwithstanding the generally accepted maxim that heat generated is directly proportional to the amount of material on the tire, shoulders 18 of casing 12 are contoured as convex arcs having a predetermined buffed Shoulder Radius $R_{CS}$ substantially less than Crown Radius $R_C$. The shoulder radius is chosen in accordance with a number of factors:

1. To ensure that sufficient material is maintained on the casing at the ends of the belt package without causing the generation of additional heat during operation of the retreaded tire;

2. To provide support for a tread pattern on tread strip 10 coextensive with crown 14 of casing 12 (suitably corresponding to the tread width of the new tire from which casing 12 derived) without causing the generation of additional heat during operation of the retreaded tire;

3. To provide, in conjunction with the contour of tread strip 10, support against both radial forces and lateral forces, encountered, for example, on tires used in multiaxle applications, and in cornering;

4. To make the assembly tolerant of small offsets from center of tread strip 10 with respect to casing 12; and, 5. To facilitate the use of a tread strip 10 that is capable of use with other casings having differing characteristic crown radii.

For casings having buffed crown radii of from 20–32 inches, similar radius $R_{CS}$ is suitably in the range of 0.3125–1.625 inches; a typical example would be 1.00 inch.

Tread strip 10 provides a tread width comparable to that of the new tire from which casing 12 was derived, and is capable of, when installed on casing 12, enduring the lateral forces generated in certain applications of retread tires. At the same time, tread strip 10 is relatively tolerant of small offsets from center during installation, and capable of installation on casings having varying crown radii (within certain ranges), without generating unacceptable potentially heat generating stresses in the assembly.

Tread 10 is designed to be utilized with a casing 12, having predetermined nominal buffed Crown Arc Width ($AW_C$) and a buffed Crown Radius $R_C$ within a predetermined range. The Crown Radius $R_C$ of the buffed casing is a characteristic of the particular type of tire from which the casing is derived and varies from tire to tire. However, a common predetermined Crown Arc Width can be accommodated by casings derived from a variety of types of new tires (new tires within a given series) notwithstanding different crown radii, particularly when the shoulder of the casing is formed as a convex arc in the manner of shoulder 18 to compensate for, e.g., variations in the configuration of the casing belt packages. The casing Crown Arc Width $AW_C$, is preferably chosen to approximate the tread width of the new tire from which casing 12 derived. In practice, to approximate the tread widths of a range on tires, the casing crown arc width is preferably chosen as the median new tire tread width for tires in the series from which casing 12 is derived.

Figure 2:
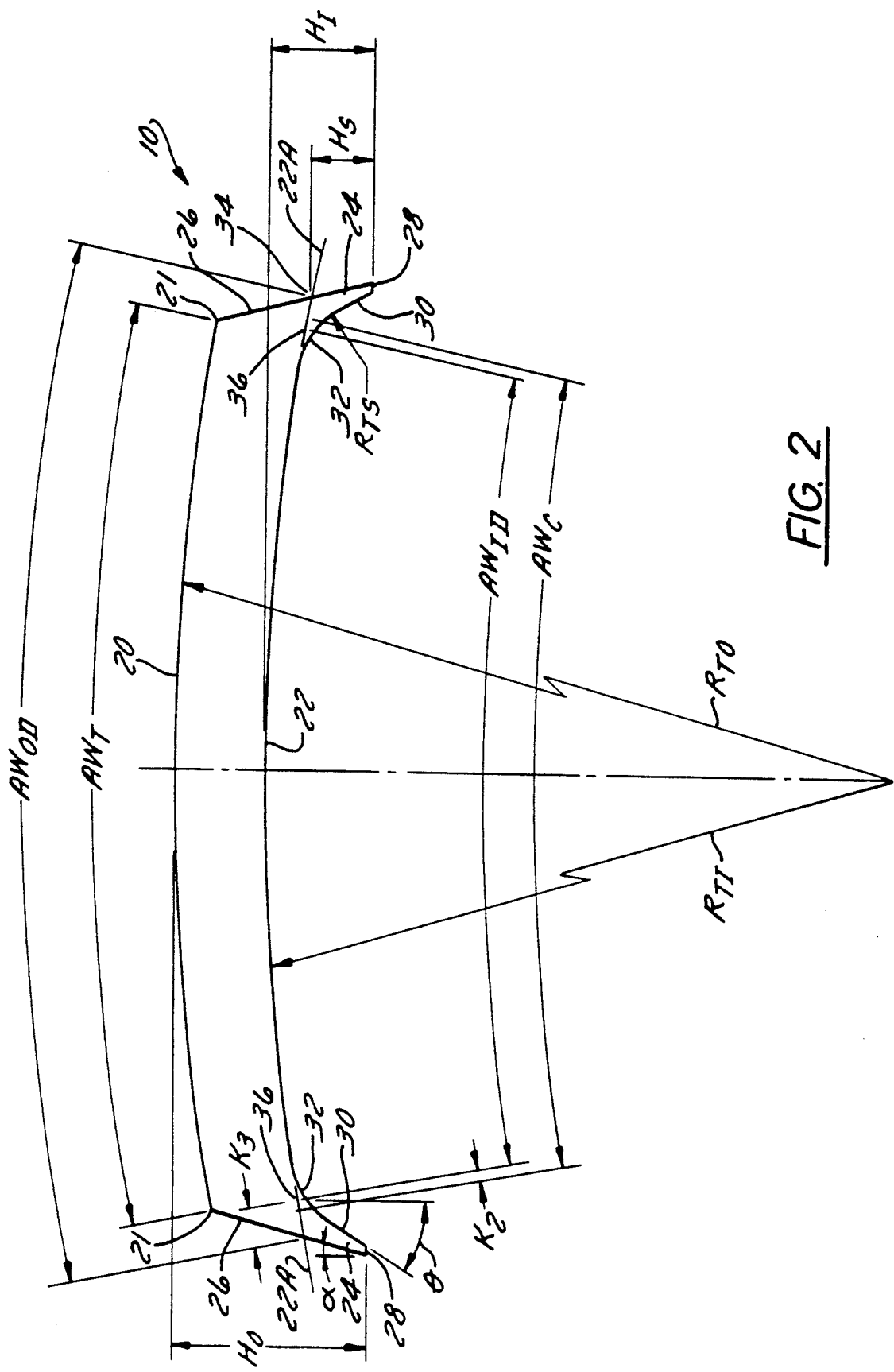
FIG. 2 is a schematic representation of a tread strip according to the invention illustrating various relevant spacial relationships.
Figure 3:
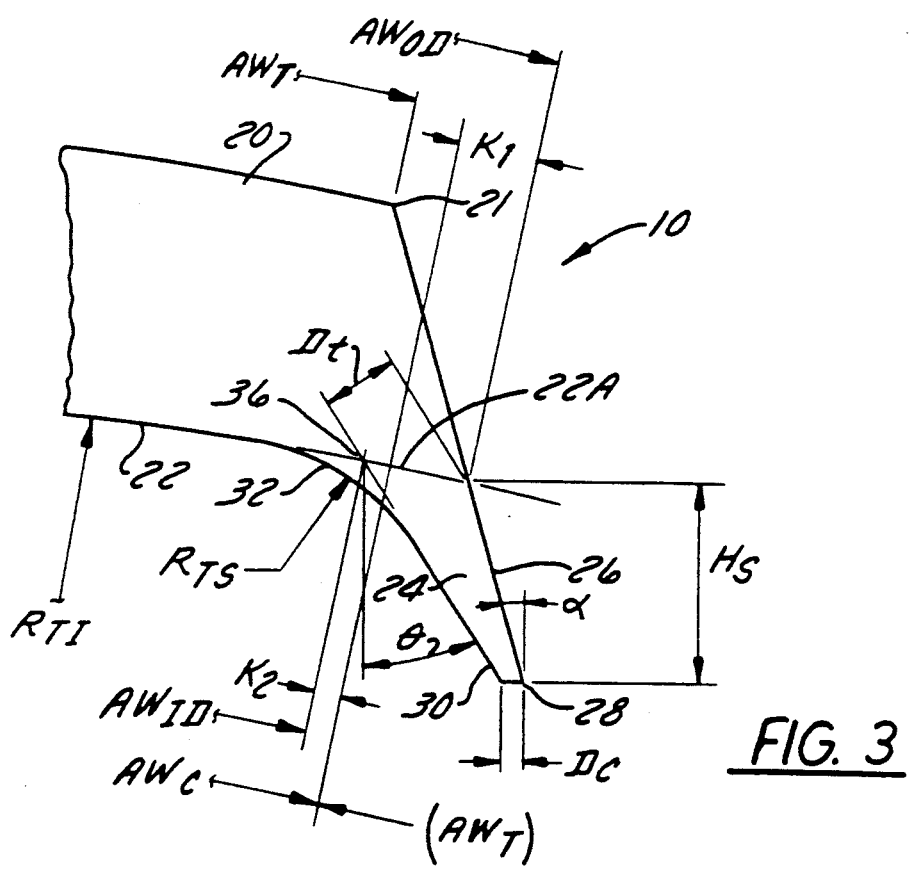
FIG. 3 is a schematic representation of the skirt of tread strip illustrating various relevant spacial relationships.

Referring now to FIGS. 1, 2 and 3, replacement tread 10 includes: an upper tread portion 20 manifesting a predetermined tread design 23 (pattern) between respective tread shoulders (edges) 21; an underside (sole), generally indicated as 22; and, respective skirts 24. Skirts 24 each include an exterior sidewall 26, an end portion 28, an interior wall 30, and a radiused interior interconnecting portion 32

The outer (road engaging) surface of tread portion 20 (shown schematically in FIGS. 2 and 3; tread pattern omitted) is designed based upon a nominal arc extending between tread shoulders 21, having a predetermined radius, Tread Outside Radius ($R_{TO}$) and a predetermined length, Tread Arc Width ($AW_T$). The actual tread pattern is built upon the nominal arc of radius $R_{TO}$ and arc width $AW_T$. However, in some applications, the exterior surface of the actual tread portion 20 may not be arcuate. For example, the thickness of tread portion 20 may vary as a function of distance from the center, or vary locally in the vicinity of the edges.

Sole 22 of tread strip 10, underlying tread portion 20, is configured along a nominal arc 22A (FIG. 2). Arc 22A is concave from the perspective of casing 12, and has a predetermined radius, Tread Inside Radius ($R_{TI}$). Sole 22 merges, at either side, with interconnecting portions 32 of skirts 24.

The radius of sole 22, Tread Inside Radius $R_{TI}$ is chosen so that tread 10 can be installed on casing having a range of buffed crown radii, i.e., in accordance with typical crown radii encountered in the series of tires for which tread 10 is intended to be used. For example, new tires having a Tread Arc Width (defined as the width of an arc from one edge of the tread to the other) of approximately eight inches typically have characteristic buffed crown radii of between 20–26 inches. Applicant has determined that a tread strip 10 configured in accordance with the present invention having a Tread Inside Radius $R_{TI}$ intermediate of that range, for example, the median value for a casing of the series 22 inches, can be installed on casings of that series without creating unacceptable heat generating stresses in the retread assembly, irrespective of the range of buffed casing crown radius.

Tread Arc Width $AW_T$ (the length of the nominal tread arc extending between tread shoulders 21), is chosen to correspond to the buffed Crown Arc width $AW_C$, of casing 12, and hence, to the tread arc width of a new tire of the series from which casing 12 is derived. Setting Tread Arc Width $AW_T$ equal to the buffed casing Crown Arc Width $AW_C$ ensures that adequate support is provided for the edges of tread 20. The radius of the nominal tread arc, Tread Outside Radius $R_{TO}$, is set equal to the radius of the sole arc denominated $R_{TI}$ plus a constant, corresponding to, for example, 24/32 inch.

Skirt 24 both improves the appearance of the retreaded tire and tends to increase the durability and mileage performance of the retread assembly. For example, in multiaxle applications, skirt 24 protects casing shoulder 18 during cornering. This tends to extend the use and life of casing 12. Skirt 24 provides solid support to edges 21 of replacement tread strip 10 permitting tread 10 to manifest a cross-sectional profile similar to that of a new tire. This will give the retread a better mileage performance during application.

Exterior sidewalls 26 and interior walls 30 of skirt 24 are suitably planar, manifested as straight lines in the transverse plane (cross section). Exterior sidewalls 26 and interior walls 30 extend downwardly and outwardly from tread shoulders 21, and skirt interconnecting portions 32, respectively, disposed at predetermined angles $\Theta$, and $\alpha$ respectively with respect to vertical. The angles are chosen in accordance with Tread Arc Width $AW_T$, the length of skirt 24, the particular series of casings with which tread 10 is intended to be used, and the particular application in which the assembly is intended to be used. The angle $\Theta$ of interior walls 30 is suitably within the range of 25°–40° and preferably within the range of 30°–35°; and particularly 32° for a casing Shoulder Radius $R_{CS}$ of one inch. The angle $\alpha$ of exterior surface 26 is suitably within the range of 25°–5° and preferably within the range of 20°–12°, and particularly 16°.

The relative dispositions of the respective exterior sidewalls 26 and interior walls 30 are such that the lengths of respective nominal arcs at Inside Tread Radius $R_{TI}$ are equal to predetermined values related to 11.5, for example, as shown in Table A. Such sizes as provided by Bandag, Incorporated are shown in Table A, together with the relevant dimensions of the buffed tire casing (all dimensions in inches).

TABLE A

| | TREAD DIMENSION | | | | BUFFED CASING DIMENSION | | |
|---|---|---|---|---|---|---|---|
| Tread Size (Designator) | Outside Design Arc Width $AW_{OD}$ | Inside Design Arc Width $AW_{ID}$ | Tread Arc Width $AW_T$ | Tread Inside Radius $R_{TI}$ | Buffed Casing Arc Width $AW_C$ | Characteristic Crown Radius $R_C$ | Buffed Shoulder Radius $R_{CS}$ |
| 8 | 8.312 | 7.687 | 7.937 | 22 | 7.9375 | 20–26 | 1.00 |
| 8.5 | 8.625 | 8.00 | 8.250 | 24 | 8.250 | 22–26 | 1.00 |
| 9 | 8.937 | 8.3125 | 8.562 | 24 | 8.5625 | 22–32 | 1.00 |
| 9.5 | 9.28 | 8.66 | 8.91 | 28 | 8.91 | 22–30 | 1.00 |
| 10.5 | 9.69 | 9.06 | 9.31 | 28 | 9.31 | 26–32 | 1.00 |
| 11.5 | 10.16 | 9.53 | 9.78 | 30 | 9.78 | 30–32 | 1.00 |

Tread Arc Width $AW_T$:

an Outside Design Arc Width $AW_{OD}$, the portion of nominal arc 22A extending between intersections 34 with exterior side walls 26 of skirts 24, is set at a value greater than Tread Arc Width $AW_T$;
and,
an Inside Design Arc Width $AW_{ID}$ the portion of nominal arc 22A extending between the junctures 36 the intersection of arc 22A and a line nominally extending from of interior walls 30), is set at a value less than Tread Arc Width $AW_T$.

More specifically, Outside Design Arc Width $AW_{OD}$ is set equal to the Tread Arc Width $AW_T$ plus a constant $K_1$ ($AW_{OD}=AW_{T+K1}$) and Inside Design Arc Width $AW_{ID}$ is set equal to Tread Arc Width $AW_T$ minus a constant $K_2$ ($AW_{ID}=AW_T-K_2$). Thus, $AW_{ID} = {}_{AOD}-K_3$, where $K_3=K_1+K_2$.

Constants $K_1$ and $K_2$ are chosen in accordance with Tread Arc Width $AW_T$ and the particular series of casings 12 which tread 10 is intended to be used. Constant $K_1$ is suitably within the range of 0.1875–0.750, and preferably within the range of 0.250–0.750, and particularly, 0.375 inch. Constant $K_2$ is suitably within the range of 0.0625–0.250, and preferably within the range of 0.125–0.250, and particularly 0.156 inch. Constant $K_3$ is suitably within the range of 0.250–1.000, and preferably within the range of 0.375–1.000, and particularly 0.531 inch.

As best seen in FIG. 3, the distance between intersection 34 and junction 36 is set at a predetermined distance $D_t$, suitably in the range of 0.0900–0.360, and preferably in the range of 0.135–0.360, and particularly 0.232 inch.

The walls 26 and 30 of skirts 24 extend a predetermined vertical distance below sole 22, i.e., a distance $H_3$ (measured from juncture 34), and are connected by end walls 28. Skirt Height $H_S$ is suitably in the range of ¼ inch to 2 inches; a typical example would be 0.604 inch. Endwall 28 is also suitably planar, manifesting substantially as a point or a short straight line in the transverse plane having a predetermined width $D_e$, suitably zero. A typical example would be 0.063 inch.

Skirt radius interconnecting portions 32 provide smooth and continuous transitions from sole 22 to skirt interior sidewalls 30. Radiused portion 32 exhibits a predetermined radius $R_{TS}$ chosen to assist in removing original tread design shoulder voids and provide for ease of assembly with cushion gum II. Radius $R_{TS}$ is suitably in the range of 0.500–1.500 inches; a typical example would be 0.75 inch.

Various dimensions of preferred embodiments of tread strip 10 for casings corresponding to tires having nominal industry tread size of 8, 8.5, 9, 9.5, 10.5 and Tread strip 10 may be prepared by molding uncured tread material in a vulcanizing press. For example, tread 10 may be formed in a two-piece mold having a female portion containing the tread pattern or tread design and exterior of skirt 24 and male portion defining sole 22 and the interior portions of skirt 24. This arrangement facilitates the manufacture of treads 10 having different tread patterns. Tread portion 20 may be formed with any conventional design.

The replacement tread 10 is affixed to tire casing 12 to form a retread assembly. Tire casing 12 is profiled, suitably by mechanical buffing to its characteristic Crown Radius $R_C$, and to the predetermined Crown Arc Width $AW_C$ and Shoulder Radius $R_{CS}$ associated with tread 10. Bonding material 11 is provided between replacement tread 10 and tire casing 12. Sole 22 is generally aligned with crown 14 and skirts overly shoulders 18. The assembly comprising the tire casing 12, bonding layer 11 and replacement tread 10 are suitably processed in accordance with conventional cold bonding techniques to form a retreaded tire.

The retread assembly is advantageous in a number of respects. Replacement tread 10 approximates the tread arc width of the original tire from which casing 12 was derived, but with the endurance and wear benefits attendant in the compounds employed in forming tread strip 10. Nominal differences in tire sizes which occur when tire casings are produced by different tire manufacturers are accommodated, without producing deleterious stresses in the assembly. Stresses on skirt 24 of replacement tread 10 are reduced because of the correspondence between the configuration of replacement tread 10 and the buffed profile of tire casing 12.

The final retreaded tire has an improved appearance and is readily marketable. Skirts 24 substantially cover shoulder 18 and may extend onto side wall 16 of tire casing 12. This permits nearly complete elimination of the preexisting tread shoulder design from the tire casing, and coverage of substantially all of the areas of the casing which have been buffed.

Further, the replacement tread 10 offers substantial benefit to eliminate or reduce lifting caused by lateral forced encountered during use then prior art top cap retreads. An example would be in multi-axle applications where cornering tends to cause the side profile of conventional top caps to roll during some stress applications. Such rolling tends to be reduced or eliminated with use of the replacement tread 10 of the invention.

Referring again to FIGS. 1 and 4, tread strip 10 may also include respective decoupler grooves 40 positioned adjacent the outer edges of tread portion 20. Decoupler grooves 40 are known for use in new tires to aid in reducing irregular wear in the exterior shoulder of the tire. In particular, during cornering, a narrow rib 42 to the outside of decoupler groove 40 is forced against respective major shoulder ribs 44 of tread 20. Narrow rib 42 supports shoulder 44, and acts as a barrier to protect shoulder rib 44 from eroding during cornering. A squared operative edge is thus maintained. Decoupler grooves have not, however, typically been used in replacement tread strips. In the context of tread strip 10, decoupler groove 40 serves not only as an aid in reducing irregular wear, but also to provide additional relief against potential stresses in the assembly caused by network biasing during retreading permitting skirt 24 to contact shoulder areas 18 of the casing.

It will be understood that, while various specific dimensions of the replacement tread according to the invention have been described, they are not so described in a limiting sense, and the replacement tread according to the invention may be suitably configured to be adapted to a tire casing of any size, as is understood in the art. Further, it should be appreciated that the above description is of a preferred exemplary embodiment of the present invention, and the invention is not limited to the specific form shown herein. For example, numerous modifications in the tread design of the replacement tread and in the attachment of the replacement tread a tire casing may be utilized as is known or hereafter devised by those of ordinary skill in the art. These and other modifications may be made in the design and arrangement of the elements within the scope of the invention, expressed in the appended claims hereto.

I claim:

1. A pre-vulcanized tread strip for installation on a tire casing, the casing including a peripheral crown manifesting in a cross-sectional plane through the nominal axis of rotation of the casing an arc having a predetermined radius of curvature, $R_C$, and a predetermined arc width, $AW_C$, and respective shoulders disposed on either side of said crown, each of the shoulders manifesting in cross-sectional plane, an arc having a radius of curvature, $R_{CS}$, less than $R_C$, said tread strip comprising:

a sole comprising, in a cross-sectional plane, a portion of a nominal arc having a predetermined radius of curvature $R_{TI}$;

respective tread shoulders;

an upper tread portion, manifesting a predetermined tread design, disposed between said shoulders and overlying said sole, said upper tread portion having associated therewith a nominal arc extending between said tread shoulders, said upper tread portion having a predetermined radius of curvature equal to said sole radius of curvature, $R_{TI}$, plus a predetermined constant whereby the tread portion between said shoulders is arched and of substantially uniform thickness, and said upper tread portion having a predetermined arc length $AW_T$, and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$, less than sole radius; $R_{TI}$, an exterior sidewall extending downwardly and outwardly from said tread shoulders, disposed at a predetermined angle $\alpha$ with respect to vertical;

the exterior sidewalls of said respective skirts being disposed such that the portion of said nominal arc of radius $R_{TI}$ extending between respective intersections with the exterior sidewalls is of a predetermined length, $AW_{OD}$, greater than $AW_T$ by an amount equal to a first predetermined constant $K_1$ within the range of about 0.1875 inch to about 0.750 inch; and the interior walls of said respective skirts being disposed such that the portion of said nominal arc of radius $R_{TI}$ extending between respective intersections with nominal extensions of said interior walls is of a predetermined length, $AW_{ID}$, less than $AW_T$ by an amount equal to a second predetermined constant $K_2$ within the range of about 0.0625 to about 0.250 inch, and wherein $R_{TS}$ is less than $R_{CS}$.

2. The prevulcanized tread of claim 1 wherein constant $K_1$ is within the range of about 0.250 to about 0.750 inch.

3. The prevulcanized tread of claim 2 wherein constant $K_1$ is equal to approximately 0.375 inch.

4. The prevulcanized tread of claim 1 wherein constant $K_2$ is within the range of about 0.125 to about 0.250 inch.

5. The prevulcanized tread of claim 4 wherein constant $K_2$ is equal to approximately 0.156 inch.

6. The pre-vulcanized tread of claim 1 wherein $AW_{ID}$ id equal to $AW_{OD}$ minus a third predetermined constant, $K_3$, where constant $K_3$ is within the range of about 0.250 to about 1.000 inch.

7. The prevulcanized tread of claim 6 wherein constant $K_3$ is within the range of about 0.375 to about 1.000 inch.

8. The prevulcanized tread of claim 7 wherein constant $K_3$ is equal to approximately 0.531 inch.

9. The prevulcanized tread of claim 1 wherein $R_{TS}$ is in the range of about 0.500 to about 1.500 inches.

10. The prevulcanized tread of claim 9 wherein $R_{TS}$ is equal to approximately 0.750 inch.

11. The prevulcanized tread of claim 1 wherein angle $\Theta$ of said interior walls is within the range of about 25 to about 40°.

12. The prevulcanized tread of claim 11 wherein angle $\Theta$ of said interior walls is within the range of about 30 to about 35°.

13. The prevulcanized tread of claim 12 wherein angle $\Theta$ of said interior walls is equal of approximately 32°.

14. The prevulcanized tread of claim 1 wherein angle $\alpha$ of said exterior sidewalls is within the range of about 25° to about 5°.

15. The prevulcanized tread of claim 14 wherein angle $\alpha$ of said exterior sidewalls is within the range of about 20° to about 12°.

16. The prevulcanized tread of claim 15 wherein angle $\alpha$ of said exterior sidewalls is equal to approximately 16°.

17. The prevulcanized tread of claim 14 wherein said distance $D_t$ is in the range of 0.135 to about 0.360 inch.

18. The prevulcanized tread of claim 17 wherein said distance $D_t$ is approximately 0.232 inch.

19. The pre-vulcanized tread of claim 1 wherein said skirt exterior side wall has a distance $D_t$, said distance being measured between the intersection of said nominal arc of radius $R_{TI}$ with a line extending along said interior skirt side wall and the intersection of a line parallel to said interior skirt side wall line, said nominal arc of radius $R_{TI}$, and the exterior skirt side wall, said distance $D_t$ being measured along a normal to said interior skirt side wall.

20. A pre-vulcanized tread strip for installation on a tire casing, the casing including a peripheral crown manifesting in a cross-sectional plane through the nominal axis of rotation of the casing an arc having a predetermined radius of curvature, $R_C$, and a predetermined arc width, $AW_C$, and respective shoulders disposed on either side of said crown, each of the shoulders manifesting in cross-sectional plane, an arc having a radius of curvature, $R_{CS}$, less than $R_C$, said tread strip comprising:

a sole comprising, in a cross-sectional plane, a portion of a nominal arc having a predetermined radius of curvature $R_{TI}$;

respective tread shoulders;

an upper tread portion, manifesting a predetermined tread design, disposed between said shoulders and overlying said sole, said upper tread portion having associated therewith a nominal arc extending between said tread shoulders, said upper tread portion having a predetermined radius of curvature equal to said sole radius of curvature, $R_{TI}$, plus a predetermined constant whereby the tread portion between said shoulders is arched and of substantially uniform thickness, and said upper tread portion having a predetermined arc length $AW_T$; and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$, less than said sole radius $R_{TI}$;

an exterior sidewall extending downwardly and outwardly from said tread shoulders, disposed at a predetermined angle $\alpha$ with respect to vertical;

the exterior sidewalls of said respective skirts being disposed such that the portion of said nominal arc of radius $R_{TI}$ extending between respective intersections with the exterior sidewalls is of a predetermined length, $AW_{OD}$, greater than $AW_T$ by an amount equal to a first predetermined constant $K_1$ within the range of about 0.1875 inch to about 0.750 inch; and the interior walls of said respective skirts being disposed such that the portion of said nominal arc of radius $R_{TI}$ extending between respective intersections with nominal extensions of said interior walls is of a predetermined length, $AW_{ID}$, less than $AW_T$ by an amount equal to a second predetermined constant $K_2$ within the range of about 0.0625 to about 0.250 inch, and wherein $AW_T$ is equal to $AW_C$.

21. A retread tire comprising a tire casing and a pre-vulcanized tread strip installed thereon, wherein:

said casing includes:

a peripheral crown manifesting, in a cross-sectional plane through the nominal axis of rotation of said casing, an arc having a predetermined radius of curvature, $R_C$, and a predetermined arc width, $AW_C$; and respective shoulders disposed on either side of said crown, each manifesting, in said cross-sectional plane, an arc having a radius of curvature, $R_{CS}$ less than $R_C$;

and said pre-vulcanized tread strip comprises:

a sole manifesting, in said cross-sectional plane, a portion of a nominal arc having a predetermined radius of curvature $R_{TI}$ corresponding to said predetermined range of values of casing crown radius of curvature, $R_{CS}$, said sole overlying said casing crown;

respective tread shoulders;

an upper tread portion, manifesting a predetermined tread design, disposed between said shoulders and overlying said sole, said upper tread portion having associated therewith a nominal arc in said cross-sectional plane extending between said tread shoulders, said upper tread portion having predetermined radius of curvature equal to said sole radius of curvature, $R_{TI}$, plus a predetermined constant whereby the tread portion between said shoulders is arched and of substantially uniform thickness, and said upper tread portion having a predetermined arc length, $AW_T$; and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$;

an exterior sidewall extending downwardly and outwardly from said tread shoulders, disposed at a predetermined angle $\alpha$ with respect to vertical;

the exterior sidewalls of said respective skirts being disposed such that the portion of said nominal arc of radius $R_{TI}$ extending between respective intersections with the exterior sidewalls is of a predetermined length, $AW_{OD}$, greater than $AW_T$ by an amount equal to a first predetermined constant $K_1$ within the range of about 0.1875 inch to about 0.750 inch; and the interior walls of said respective skirts being disposed such that the portion of said nominal arc of radius $R_{TI}$ extending between respective intersections with nominal extensions of said interior walls is of a predetermined length, $AW_{ID}$, less than $A_{WT}$ by an amount equal to the second predetermined constant $K_2$ within the range of about 0.0625 to about 0.250 inch and wherein $R_{TS}$, prior to installation of the strip on the casing, is less than $R_{CS}$.

22. A retread tire comprising a tire casing and a pre-vulcanized thread strip installed thereon, wherein:

said casing includes:

a peripheral crown manifesting, in a cross-sectional plane through the nominal axis of rotation of said casing, an arc having a predetermined radius of curvature, $R_C$, and a predetermined arc width, $AW_C$; and respective shoulders disposed on either side of said crown, each manifesting, in said cross-sectional plane, an arc having a radius of curvature, $R_{CS}$ less than $R_C$;

and said pre-vulcanized tread strep comprises:

a sole manifesting, in said cross-sectional plane, a portion of a nominal arc having a predetermined radius of curvature $R_{TI}$ corresponding to said predetermined range of values of casing crown radius of curvature, $R_{CS}$, said sole overlying said casing crown;

respective tread shoulders;

an upper tread portion, manifesting a predetermined tread design, disposed between said shoulders and overlying said sole, said upper tread portion having associated therewith a nominal arc in said cross-sectional plane extending between said tread shoulders, said upper tread portion having a predetermined radius of curvature equal to said sole radius of curvature, $R_{TI}$, plus a predetermined constant whereby the tread portion between said shoulders is arched and of substantially uniform thickness, and said upper tread portion having a predetermined arc length, $AW_T$; and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$, less than said casing shoulder radius $R_{CS}$ prior to the time the tread strip is installed on the casing;

an exterior sidewall extending downwardly and outwardly from said tread shoulders, disposed at a predetermined angle $\alpha$ with respect to vertical;

the exterior sidewalls of said respective skirts being disposed such that the portion of said nominal arc of radius $R_{TI}$ extending between respective intersections wit the exterior sidewalls is of a predetermined length, $AW_{OD}$, greater than $AW_T$ by an amount equal to a first predetermined constant $K_1$ within the range of about 0.1875 inch to about 0.750 inch; and;

the interior walls of said respective skirts being disposed such that the portion of said nominal arc of radius $R_{TI}$ extending between respective intersections with nominal extensions of said interior walls is of a predetermined length, $AW_{ID}$, less than $AW_T$ by an amount equal to the second predetermined constant $K_2$ within the range of about 0.0625 to about 0.250 inch and wherein $AW_T$ is equal to $AW_C$.

23. A method for retreading a tire using a pre-vulcanized tread for installation on a tire casing, said method comprising the steps of:

preparing a casing having a peripheral crown manifesting, in a cross-sectional plane through the nominal axis of rotation of said casing, an arc having a predetermined radius of curvature, $R_C$, and a predetermined arc width, $AW_C$, and respective shoulders disposed on either side of said crown, each manifesting, in said cross-sectional plane, an arc having a radius of curvature, $R_{CS}$ less than $R_C$; and applying to said casing a strip of prevulcanized tread comprising:

a sole manifesting, in said cross-sectional plane, a portion of a nominal arc having a predetermined radius of curvature $R_{TI}$ corresponding to said predetermined range of values of casing crown radius of curvature, $R_{CS}$, said sole overlying said casing crown;

respective tread shoulders;

an upper tread portion, manifesting a predetermined tread design, disposed between said shoulders and overlying said sole, said upper tread portion having associated therewith a nominal arc in said cross-sectional plane extending between said tread shoulders, said upper tread portion having a predetermined radius of curvature equal to said sole radius of curvature, $R_{TI}$, plus a predetermined constant whereby the tread portion between said shoulders is arched and of substantially uniform thickness, and said upper tread portion having a predetermined arc length, $AW_T$; and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$, less than said casing shoulder radius $R_{CS}$;

an exterior sidewall extending downwardly and outwardly from said tread shoulders, disposed at a predetermined angle $\alpha$ with respect to vertical;

the exterior sidewalls of said respective skirts being disposed such that the portion of said nominal arc of radius $R_{TI}$ extending between respective intersections with the exterior sidewalls is of a predetermined length, $AW_{OD}$, greater than $AW_T$ by an amount equal to a first predetermined constant $K_1$ within the range of about 0.1875 inch to about 0.750 inch; and;

the interior walls of said respective skirts being disposed such that the portion of said nominal arc of radius $R_{TI}$ extending between respective intersections with nominal extensions of said interior walls is of a predetermined length, $AW_{ID}$, less than $AW_T$ by an amount equal to the second predetermined constant $K_2$ within the range of about 0.0615 to about 0.250 inch and wherein $R_{TS}$ is less than $R_{CS}$.

24. The method of claim 23 wherein $R_{TS}$ is approximately 0.75 inch and $R_{CS}$ is approximately 1.00 inch.

25. A method for retreading a tire using a pre-vulcanized tread for installation on a tire casing, said method comprising the steps of:

preparing a casing having a peripheral crown manifesting, in a cross-sectional plane through the nominal axis of rotation of said casing, an arc having a predetermined radius of curvature, $R_C$, and a predetermined arc width, $AW_C$, and respective shoulders disposed on either side of said crown, each manifesting, in said cross-sectional plane, an arc having a radius of curvature, $R_{CS}$ less than $R_C$; and applying to said casing a strip of pre-vulcanized tread comprising:

a sole manifesting, in said cross-sectional plane, a portion of a nominal arc having a predetermined radius of curvature $R_{TI}$ corresponding to said predetermined range of values of casing crown radius of curvature, $R_{CS}$, said sole overlying said casing crown;

respective tread shoulders;

an upper tread portion, manifesting a predetermined tread design, disposed between said shoulders and overlying said sole, said upper tread portion having associated therewith a nominal arc in said cross-sectional plane extending between said tread shoulders, said upper tread portion having a predetermined radius of curvature equal to said sole radius of curvature, $R_{TI}$, plus a predetermined constant whereby the tread portion between said shoulders is arched and of substantially uniform thickness, and said upper tread portion having a predetermined arc length, $AW_T$; and respective skirts, each said skirt including:

a generally planar interior wall disposed at a predetermined angle $\Theta$ with respect to vertical;

an interior interconnecting portion, coupling said interior wall to said sole, and comprising, in said cross-sectional plane, a portion of a nominal arc having a predetermined radius of curvature, $R_{TS}$, less than said casing shoulder radius $R_{CS}$;

an exterior sidewall extending downwardly and outwardly from said tread shoulder, disposed at a predetermined angle $\alpha$ with respect to vertical;

the exterior sidewalls of said respective skirts being disposed such that the portion of said nominal arc of radius $R_{TI}$ extending between respective intersections with the exterior sidewalls is of a predetermined length, $AW_{OD}$, greater than $AW_T$ by an amount equal to a first predetermined constant $K_1$ within the range of about 0.1875 inch to about 0.750 inch; and;

the interior walls of said respective skirts being disposed such that the portion of said nominal arc of radius $R_{TI}$ extending between respective intersections with nominal extensions of said interior walls is of a predetermined length, $AW_{ID}$, less than $AW_T$ by an amount equal to the second predetermined constant $K_2$ within the range of about 0.0625 to about 0.250 inch and wherein $AW_T$ is equal to $AW_C$.

* * * * *